(No Model.)
P. HACK.
GATE FOR WIRE FENCES.
No. 483,351. Patented Sept. 27, 1892.
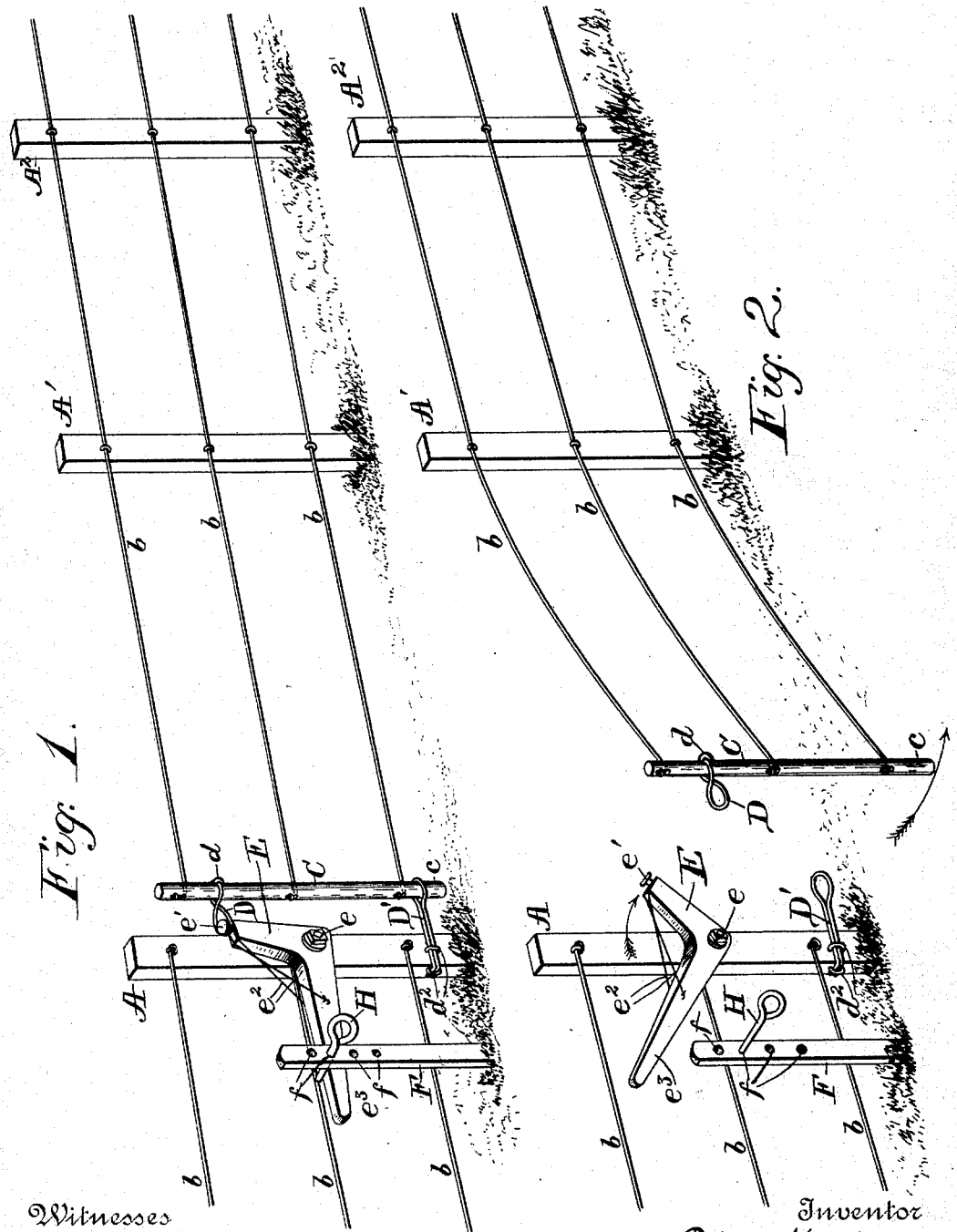

United States Patent Office.

PETER HACK, OF MICHIGAN CITY, INDIANA.

GATE FOR WIRE FENCES.

SPECIFICATION forming part of Letters Patent No. 483,351, dated September 27, 1892.

Application filed July 8, 1892. Serial No. 439,354. (No model.)

*To all whom it may concern:*

Be it known that I, PETER HACK, a citizen of the United States, residing at Michigan City, in the county of La Porte and State of Indiana, have invented certain new and useful Improvements in Gates for Wire Fences; and I do hereby declare the following to be a full, clear, and exact description of the invention, such as will enable others skilled in the art to which it appertains to make and use the same.

My invention relates to gates for wire fences; and it consists in certain novel features hereinafter described and claimed.

Reference is had to the accompanying drawings, wherein the same parts are indicated by the same letters.

Figure 1 represents a perspective view of the fence and the gate as closed, and Fig. 2 represents a perspective view of the fence and gate when the gate is partially open.

A A' A² represent the fence-posts, any one of which is adapted for use as a gate-post. The wires $b$ are securely fastened to the posts and are then cut, and the free ends are secured to the head-piece C, having a foot $c$ projecting beyond the lower wire. Near the upper portion of this head-piece a loop D, of rope or wire, is placed. This should preferably be secured thereto by a staple $d$.

On the post A, near the ground, a second loop D' is secured, as by staples $d^2$, which should be large enough to receive the lower end $c$ of the head-piece C. Pivoted to the post A is the bent lever E, secured to said post by the pivot-bolt $e$ and having a headed bolt or stud $e'$, adapted to engage the loop D. The lever is strengthened by wire $e^2$, secured to the arm $e^3$ of the lever and passing around the base of the stud.

F is a post firmly secured in the ground and having several holes $f$ for the pin H, the said pin being used for holding down the end $e^3$ of the bent lever E, as shown in Fig. 1.

The operation of the device is as follows: The gate being open, when it is desired to close the same the foot $c$ of the head-piece C is engaged in the loop D' and the stud $e'$ is hooked into the loop D, and the handle $e^3$ of the bent lever E is pressed down until the wires of the gate are sufficiently taut, when the pin is put in the appropriate one of the holes $f$. To unfasten, reverse the operation.

It will be seen that the herein-described gate may be readily made by an unskilled laborer and with such tools as are ordinarily found on a farm and with such materials as are usually on hand. Moreover, the gate may be placed at any part of the fence without making special provision therefor. It is cheap, simple, and efficient.

I am aware that gates of a somewhat similar construction have been heretofore in use; but I claim that in simplicity and cheapness of manufacture my improved gate possesses advantages not disclosed in any patent hitherto granted.

Having thus described my invention, what I claim, and desire to secure by Letters Patent of the United States, is—

1. In a gate for wire fences, the combination, with the post A, of the bent lever E, pivoted thereon, the said lever having the stud $e'$ at one end thereof and the handle $e^3$ at the other, the loop D', secured to said post, the wires $b$, the head-piece C, connected to said wires and having a foot $c$, adapted to engage in said loop D', and the loop D, secured to said head-piece and adapted to engage said stud $e'$, and means for holding said bent lever E when the gate is closed, substantially as and for the purposes described.

2. In a gate for wire fences, the combination, with the post A, of the bent lever E, pivoted thereon, the said lever having the stud $e'$ at one end thereof and the handle $e^3$ at the other, the loop D', secured to said post, the wires $b$, the head-piece C, connected to said wires and having a foot $c$, adapted to engage in said loop D', and the loop D, secured to said head-piece and adapted to engage said stud $e'$, and the post F, having holes $f$, and the pin H for holding said bent lever E when the gate is closed, substantially as and for the purposes described.

In testimony whereof I affix my signature in presence of two witnesses.

PETER HACK.

Witnesses:
ROY HAMRICK,
WALTER VAIL.